United States Patent [19]
Neumueller et al.

[11] Patent Number: 5,638,925
[45] Date of Patent: Jun. 17, 1997

[54] JERK ARRESTING MECHANISM

[75] Inventors: Maria Neumueller; Angelika Gebhard, both of Burgthann, Germany

[73] Assignee: Sifa Sitzfabrik GmbH, Rosenberg, Germany

[21] Appl. No.: 395,498

[22] Filed: Feb. 24, 1995

[30] Foreign Application Priority Data

Feb. 24, 1994 [DE] Germany .................. 44 05 992.2

[51] Int. Cl.$^6$ .................. A47C 1/027; E05D 11/08; E05F 5/00
[52] U.S. Cl. .................. 188/134; 188/67; 188/265; 74/89.15; 297/361.1
[58] Field of Search .................. 188/134, 196 D, 188/202, 381, 67, 265, 31, 60, 68, 76; 74/89.15; 297/361.1, 362.14, 361

[56] References Cited

U.S. PATENT DOCUMENTS

| | | |
|---|---|---|
| 2,767,811 | 10/1956 | Browall et al. .................. 188/196 D |
| 2,837,179 | 6/1958 | Jeppsson .................. 188/196 D |
| 3,046,055 | 7/1962 | Martens .................. 188/196 D |
| 3,096,859 | 7/1963 | Showers, Jr. et al. .................. 188/196 D |
| 3,326,336 | 6/1967 | Sobol et al. .................. 188/202 |
| 3,398,986 | 8/1968 | Homier . | |
| 3,589,477 | 6/1971 | Sander .................. 188/202 |
| 3,610,376 | 10/1971 | Baronnet et al. .................. 188/202 |
| 3,669,224 | 6/1972 | Billeter .................. 188/202 |
| 3,842,951 | 10/1974 | Farello .................. 188/202 |
| 4,094,387 | 6/1978 | Pelat et al. .................. 188/381 |
| 4,185,720 | 1/1980 | Wright, Jr. et al. .................. 188/134 |
| 4,187,933 | 2/1980 | Calabrese et al. .................. 188/134 |
| 4,236,606 | 12/1980 | Sunakoda et al. .................. 188/134 |
| 4,253,551 | 3/1981 | Calabrese .................. 188/134 |
| 4,589,301 | 5/1986 | Griner .................. 188/196 D |
| 4,646,882 | 3/1987 | Holloway et al. .................. 188/202 |
| 4,662,485 | 5/1987 | Kanjo et al. .................. 188/202 |
| 4,782,715 | 11/1988 | Chevance .................. 188/196 D |
| 4,840,257 | 6/1989 | Harrison .................. 188/196 D |
| 5,070,969 | 12/1991 | Neumüller .................. 188/196 D |
| 5,355,977 | 10/1994 | Küschall .................. 188/2 F |

FOREIGN PATENT DOCUMENTS 3907251  9/1990  Germany .

*Primary Examiner*—Douglas C. Butler
*Attorney, Agent, or Firm*—Morrison Law Firm

[57] ABSTRACT

The present invention relates to a jerk arresting mechanism to prevent the back rests of office chairs from unexpected movement such as rebounding and impacting upon users in an undesirable fashion. More generally, the mechanism described positively arrests an acceleration of one part moving relative to another part. This is accomplished in a housing fastened to one of the parts, wherein the mechanism resides, through which a spirally contoured shaft is passed that is connected to the other part. As the acceleration exceeds a predictable threshold, a nut with an outer toothed surface is axially translated relative to the shaft movement and engages a complementarily toothed surface integral with the housing. This engagement stops the rotational and linear movement of both the nut and shaft thereby arresting the movement of the parts relative to each other.

11 Claims, 6 Drawing Sheets

JERK ARRESTING MECHANISM

The invention described here relates to jerk arresting mechanisms. More particularly, the present invention relates to jerk arresting mechanisms to prevent the back rests of office chairs from unexpected movement such as rebounding and impacting upon users in an undesirable fashion.

BACKGROUND OF THE INVENTION

Office chairs having tiltable chair backs are known. Such chair backs may utilize a spring to maintain positive supporting pressure against the back of a user. However, such chairs may present a hazard to users due to sudden movement of the chair back either under the force of the spring, or due to spring failure. Such hazards are undesirable and inconvenient.

Also known in the art are devices for arresting relative movement between a first part and a second. Such devices consist of a tubular housing fastened to the first part, a nut rotatably mounted in the housing and a spindle connected to the second part. The spindle passes through the housing, and the nut turns on the spindle, inside the housing, without self-locking. The nut, which has a conical shape, when translated axially with respect to the spindle movement, is brought into increasing frictional engagement with a conical stop sector at the inside wall of the housing. Such a device is described in prior art reference DE-A-39 07 251.

Reference DE-A-39 07 251 shows a jerk arresting device shown in FIG. 6. A nut 11' with conical braking surface 24' includes an internally threaded opening which causes nut 11' to rotate threadably on a shaft 4'. Shaft 4' is thrust into and out of a cylindrical housing 2' during a jerking motion of one part fixed to the shaft 4' with respect to another fixed to the cylindrical housing 2'. The jerking motion causes conical surface 24' to frictionally engage internal conical surface 9' fixed to cylindrical housing 2'. The prior art device of FIG. 6 does not provide positive engagement between the nut 11' and the cylindrical housing 2'. Since it relies on frictional engagement it is not reliable for its intended purposes. The same force that axially translates the rotating nut also provides the force for holding the braking surfaces 9' and 24' in frictional contact. The frictional contact must be disengaged in order for the chair to move as intended. This creates an additional force that must be overcome for there to be free movement of the chair back relative to its support.

OBJECTS AND SUMMARY OF THE INVENTION

Accordingly, it is an object of the present invention to provide a jerk arresting mechanism to prevent the back rests of office chairs from sudden movement.

It is another object of the present invention to overcome the drawbacks of the prior art.

It is still another object of the present invention to provide an economical protective device for office equipment.

It is still another object of the present invention to provide a cost effective mechanical device for predictably and reliably preventing sudden acceleration in various modes.

It is still another object of the present invention to provide an arresting mechanism that has a positive actuation that does not vary with the number of cycles of operation, with time, or with the material of which it is constructed.

It is still another object of the present invention to provide an arresting mechanism that does not rely on a frictional engagement.

Briefly stated, there is provided a mechanism which positively arrests an acceleration of one part moving relative to another part. This is accomplished in a housing fastened to one of the parts, wherein the mechanism resides, through which a spirally contoured shaft is passed and is connected to the other part. As the acceleration exceeds a predictable threshold, a cylindrical body with an outer toothed surface is axially translated with respect to shaft movement and engages a complementarily toothed surface integral with the housing. This engagement stops the rotational and linear movement of both the cylindrical body and shaft thereby arresting the movement of the parts relative to each other.

According to the invention, in such a jerk arresting mechanism, the nut of the prior art is a cylindrical body, and the stop sector is at least a projection arranged at the inside wall of the housing. On surfaces opposite each other, the cylindrical body and the projection are provided with locking elements that can be made to engage each other, and between the cylindrical body and the housing facing the head of the spindle shaft, a pressure spring is provided, wherein the locking is achieved after overcoming at least a part of the spring force.

Advantageously, the stop sector is a rotating web, allowing the integral addition of shock absorbing characteristics to increase ruggedness and prevent mechanism damage from shock inherent with high load acceleration.

Advantageously also, the locking elements are in the shape of radially helical teeth.

Advantageously also, between the cylindrical body and the pressure spring is an intermediate spacer passing alongside the stop sector, wherein the intermediate spacer can be designed to form a single piece with the cylindrical body.

Advantageously, to optimize function, caged ball bearings, each arranged between races, are inserted between the cylindrical body and the housing opposite the head of the spindle and between the intermediate spacer and the pressure spring.

Advantageously, the jerk arresting mechanism is designed in such a way that the housing, and the pressure spring are dimensioned so that the other elements, namely the cylindrical body, the intermediate spacer and the ball bearings with the races are contiguous in resting position.

According to an embodiment, a jerk arresting mechanism comprises; a spirally threaded shaft, a cylindrical body, with a first stop sector surface and a spirally threaded hole, complementary to and rotatably intermeshed with threads of the spirally threaded shaft, a housing with a second stop sector surface and guide holes slidably connected to the shaft. To retain the cylindrical body in a position whereby the first stop sector surface is complementarily juxtaposed to but not touching the second stop sector surface, a spring member to exert a limited force to separate the stop sector surfaces, and the first stop sector surface having locking elements complementary to locking elements on the second stop sector surface whereby the stop sector surfaces interlock whenever the limited force of the spring member is overcome.

According to an embodiment, a jerk arresting mechanism comprises; a housing means immovably fixed to a movable object, a shaft means for slidably connecting the housing means with a stationary object, a spiral means for translating longitudinal movement of the shaft means through the housing means into rotational movement of a rotatable cylindrical body axially and spirally slidably associated with the shaft means and slidably, rotationally associated internally with the housing means, a first stop sector surface on an exterior face of the rotatable cylindrical body, a second stop sector surface located on an interior face of the housing means in a position whereby the first stop sector surface is complementarily juxtaposed to but not touching the second braking surface, and a means to exert a limited force to separate the first and second stop sector surfaces.

According to an embodiment, a two directional jerk arresting mechanism comprises; a spirally threaded shaft, a cylindrical body, with a first stop sector surface, a second stop sector surface located on a face opposite the first stop sector surface, and a spirally threaded hole complementary to and rotatably intermeshed with the threads of the spirally threaded shaft, a housing with a third stop sector surface and guide holes slidably connected to the shaft, to retain the cylindrical body in a position whereby the first stop sector surface is complementarily juxtaposed to but not touching the third stop sector surface, a sleeve with a forth stop sector surface slidably insertable over the shaft into the housing to a position whereby the second stop sector surface is complementarily juxtaposed to but not touching the fourth stop sector surface and having a key projection to complimentarily fit into a lock indentation in the housing, a first spring member to exert a limited force to separate the first and third stop sector surfaces, and a second spring member to exert the same limited force opposing the first spring member to separate the second and fourth stop sector surfaces.

According to an embodiment, a two directional jerk arresting mechanism comprises; a housing means immovably fixed to a movable object, a shaft means for slidably connecting the housing means with a stationary object, a spiral means for translating longitudinal movement of the shaft means through the housing means into rotational movement of a rotatable cylindrical body axially and spirally slidably associated with the shaft means and slidably, rotationally associated internally with the housing means, a first stop sector surface on an exterior face of the rotatable cylindrical body, a second stop sector surface located on an interior face of the housing means in a position whereby the first stop sector surface is complementarily juxtaposed to but not touching the second stop sector surface, a third stop sector surface on an exterior face opposite the first stop sector surface of the rotatable cylindrical body, a fourth stop sector surface immobilized within the housing means in a position whereby the third stop sector surface is complementarily juxtaposed to but not touching the fourth stop sector surface while the first stop sector surface is complementarily juxtaposed to but not touching the second stop sector surface, a first means to exert a limited force to separate the first and second stop sector surfaces, and a second means to exert the same limited force opposing the first limited force to separate the third and fourth stop sector surfaces.

DETAILED DESCRIPTION OF THE PREFERRED EMBODIMENT

Figure 1:
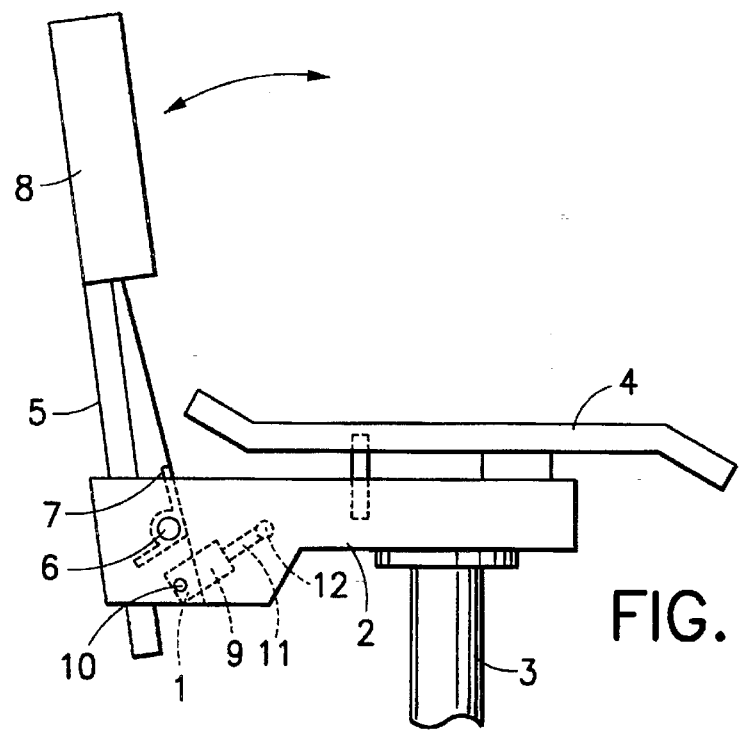
FIG. 1 is a hidden line view of a jerk arresting mechanism connected to a chair according to an embodiment of the present invention.

Referring to FIG. 1, A seat carrier flame 2 supports a seat platform 4 of an office swivel chair. A column 3, in turn, supports seat carrier frame 2. A seat-back support frame 5 is pivotally attached near a lower end to seat carrier frame 2 by a pivot pin 6. A spring 7 urges against seat-back support frame 5 and seat carrier frame 2 to urge seat-back support frame 5 to a forward-most position, while permitting seat-back support frame 5 to be rocked back and forth in the directions as indicated by the arrows. Seat-back support frame 5 supports a seat-back 8 at an upper end thereof.

At a point on the lower end of seat-back support frame 5, on a side of pivot pin 6 opposite seat back 8, seat-back support frame 5 is pivotably connected to a jerk arresting mechanism 1 a first pivot axis 10 of a cylindrical housing 9. Seat carrier frame 2 pivotably supports a spindle shaft 11 at a second pivot axis 12.

Spindle shaft 11 slides within cylindrical housing 9 to allow the distance between first pivot axis 10 and second pivot axis 12 to be varied. This variability permits seat-back support frame 5 and seat-back 8 to pivot about pivot pin 6 under the control of jerk arresting mechanism 1. As explained further on, jerk arresting mechanism 1 selectively prevents and permits free sliding of spindle shaft 11 within cylindrical housing 9. When chair back 8 is moved normally, such as when a person sits in the chair, jerk arresting mechanism 1 permits free sliding of spindle shaft 11 within cylindrical housing 9. However, if a sudden movement of seat back 8 occurs, jerk arresting mechanism 1 prevents free sliding of spindle shaft 11 within cylindrical housing 9 in turn preventing seat back 8 from moving suddenly.

Figure 2:
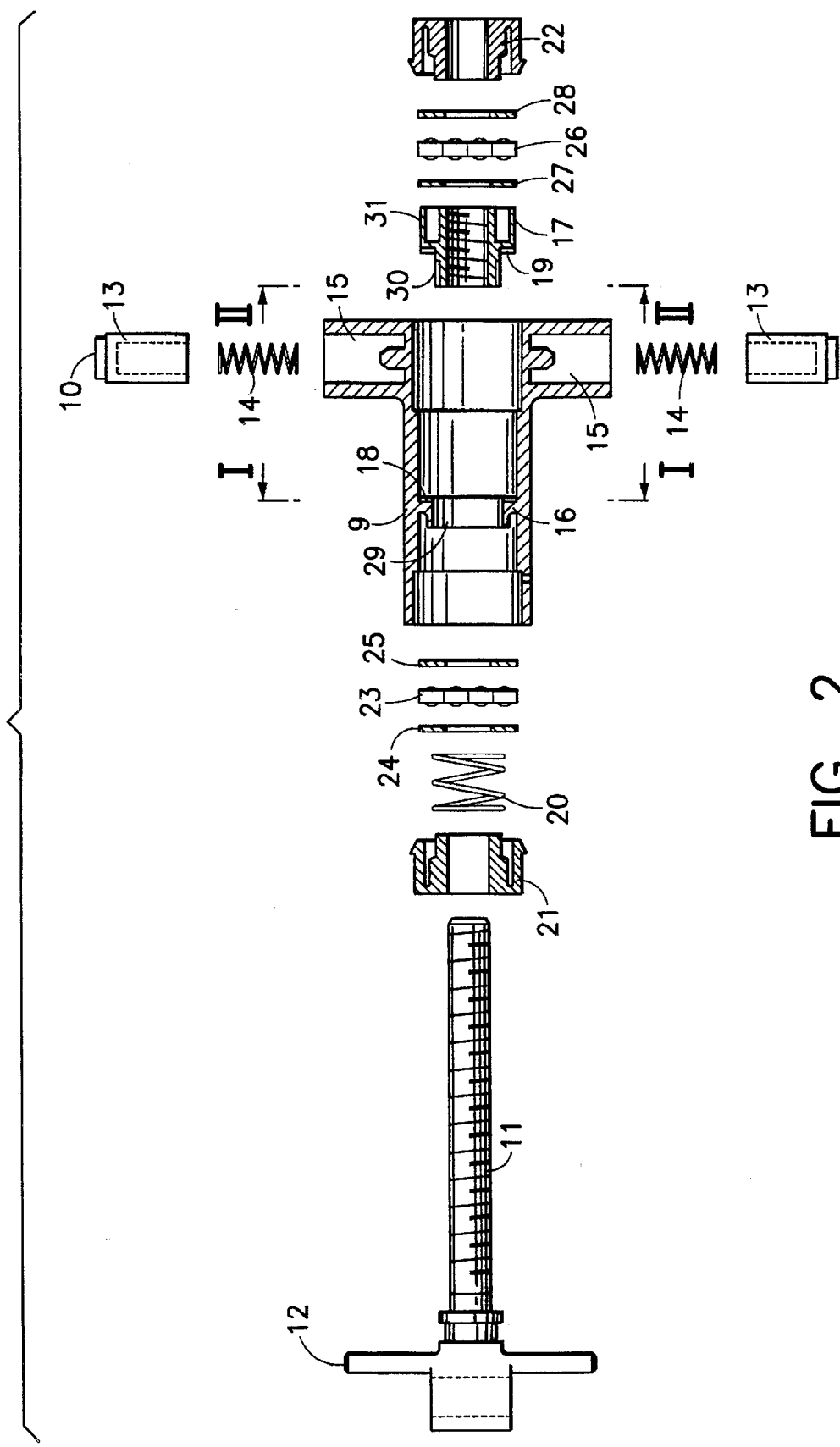
FIG. 2 is an exploded view of the assembly of the jerk arresting mechanism of FIG. 1.
Figure 2A:
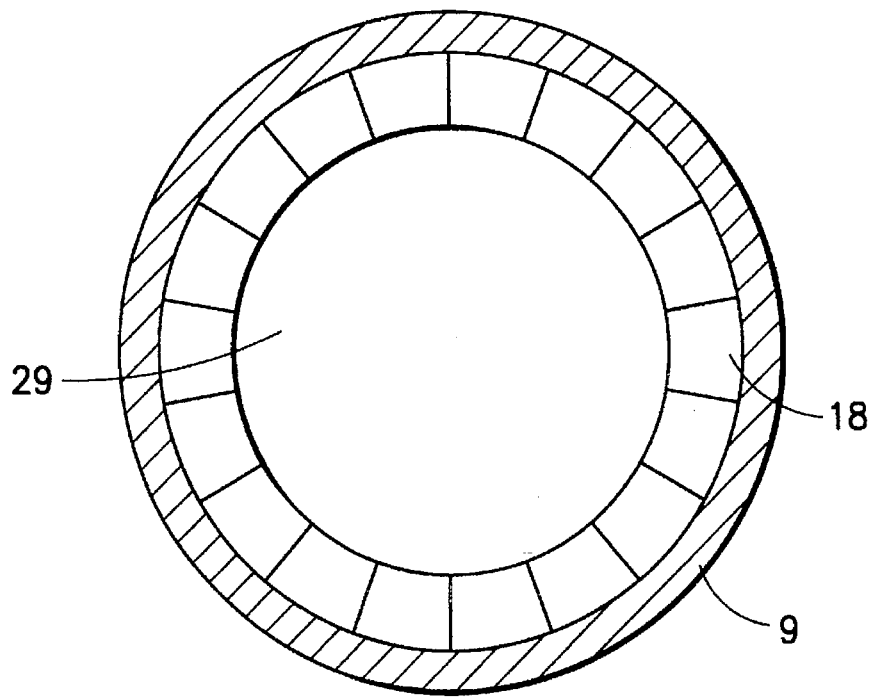
FIG. 2a is a cross section view taken along line I—I of FIG. 2, as viewed from the direction of the associated arrows.
Figure 2B:
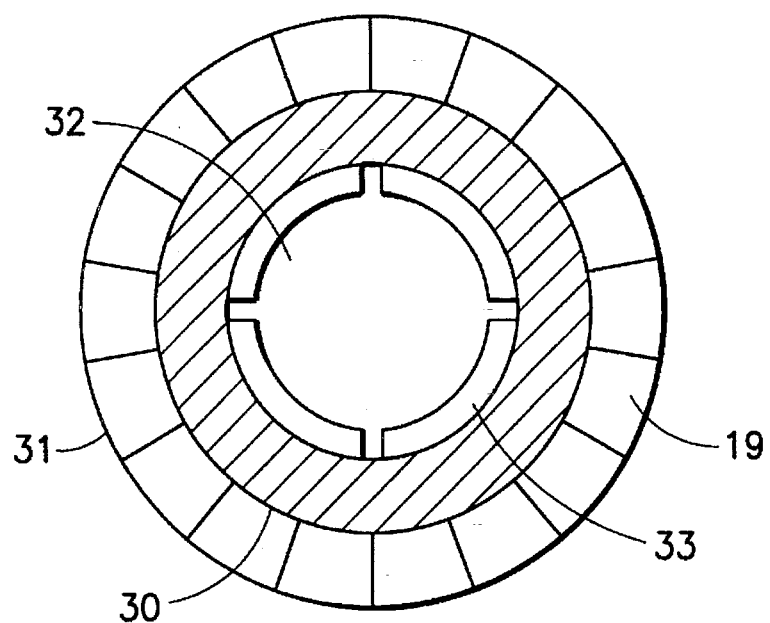
FIG. 2b is a cross section view taken along line II—II of FIG. 2, as viewed from the direction of the associated arrows.

Referring now to FIGS. 2, 2a and 2b, cylindrical housing 9 includes an integral pair of second pivot axis socket 15 which slidably receive respective snap pin springs 14 and snap pins 13. Snap pin springs 14 urge snap pins 13 into complementary holes in seat-back support frame 5.

An interior bore of cylindrical housing 9 includes an integral annular toothed stop sector 16 which has integral stationary teeth 18 on a lower surface thereof. A cylindrical body, hereinafter rotatable element 17, has a larger diameter locking nut body 31 and a smaller diameter guide sleeve spacer 30. Rotating locking nut 17 has integral rotating teeth 19 on a step surface of locking nut body 31. When assembled, rotating teeth 19 face stationary teeth 18. As further described below, rotating teeth 19 engage stationary teeth 18 when rotatable element 17 is thrust axially toward stationary teeth 18 thereby preventing rotatable element 17 from rotating.

Referring also to FIGS. 2a and 2b, integral stationary teeth 18 are arranged radially on an inside shoulder continuous with a wall of the interior bore of cylindrical housing 9.

Rotatable element 17 is free to move axially in the annular bore of cylindrical housing 9. Rotatable element 17 is urged in a contraction direction away from stationary teeth 18 at one end of its travel by the force of a float spring 20. Float spring 20 is in turn constrained by a first end cap 21 fitted into a first end of the axial bore of cylindrical housing 9. A second end cap 22 limits axial travel of rotatable element 17 in a contraction direction, opposite the extension direction. Second end cap 22 is fitted into a second end of the axial bore of cylindrical housing 9.

A caged bearing 23 sandwiched between races 24 and 25 permits rotatable element 17 to rotate freely against float spring 20. Similarly, another caged bearing 26, sandwiched between races 27 and 28 permits rotatable element 17 to rotate freely against second end cap 22. Each caged bearing includes respective ball bearings and a cage.

Figure 4:
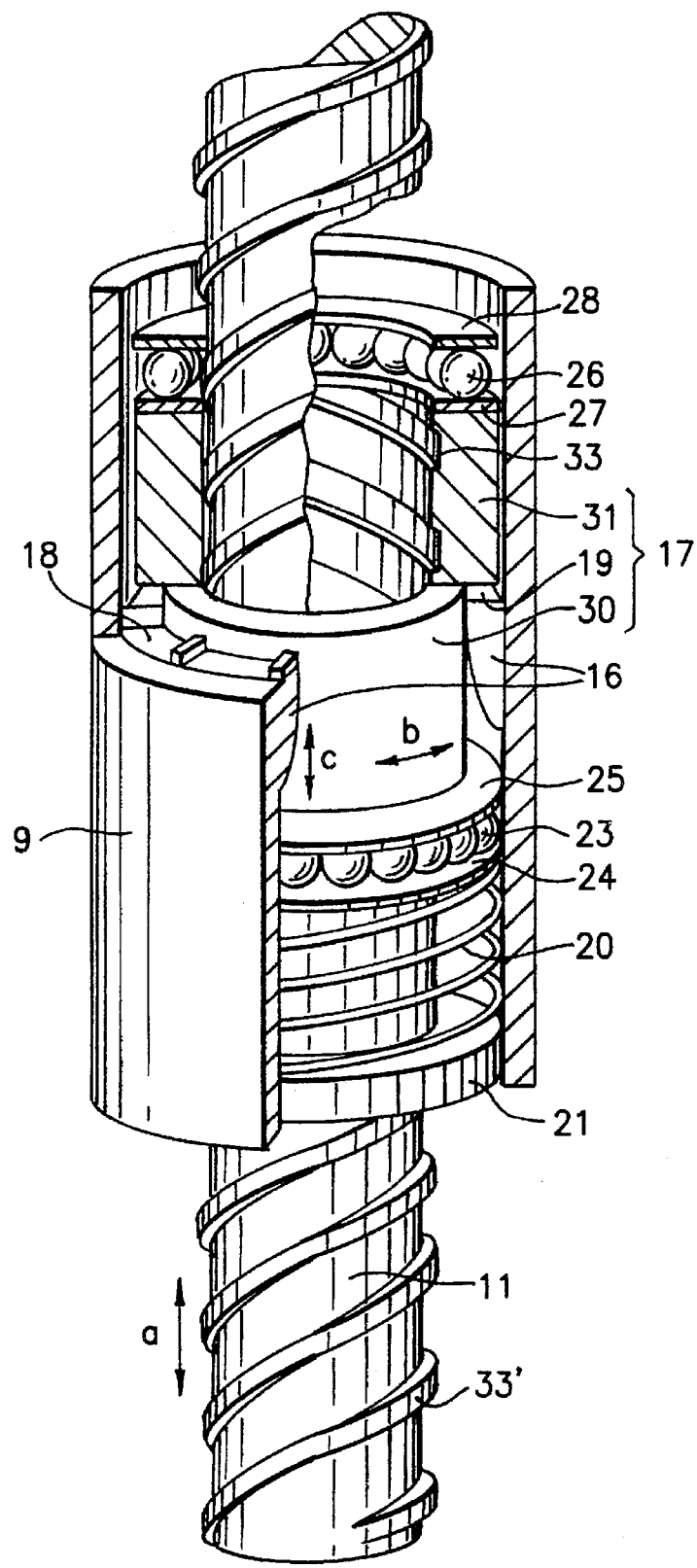
FIG. 4 is a perspective view of the jerk arresting mechanism with parts of the housing and spindle shaft cut away to illustrate the relationship between the functional elements of the device.

Referring now also to FIG. 4, spindle shaft 11 is inserted in rotatable element 17. Spindle shaft 11 has external spiral threads 33' which threadably engage internal spiral threads 33 in an annular bore of rotatable element 17. Both sets of threads have high helix angles (the angle made by the helix of the thread at the pitch diameter with a plane perpendicular to the axis) so that rotatable element 17 is turned, with relatively little attendant friction, when spindle shaft 11 is thrust into and out of cylindrical housing 9.

When spindle shaft 11 is pulled slowly in the extension direction, float spring 20 prevents rotating teeth 19 from engaging stationary teeth 18 permitting rotatable element 17 to rotate freely. However, if spindle shaft 11 is pulled abruptly in the extension direction, rotatable element 17 is carried with spindle shaft 11 overcoming the force of float spring 20. Rotatable element 17 is carried because rapid acceleration of spindle shaft in an axial direction is translated to rotation of rotatable element 17 through meshed internal and external spiral threads 33 and 33'. Compared to slower axial movement: (1) the components of axial frictional forces normal to the spiral thread contact surfaces are higher due to higher axial acceleration and are not balanced proportionately by the force of an invariant spring constant of float spring 20 and (2) the rotation of rotatable element is coerced by the constant spring constant of float spring 20 while the force of the moment of inertia of rotatable element 17 is much higher resulting in a relatively lower rotational acceleration rate. Both items 1 and 2 tend to cause rotatable element 17 to prefer axial movement over rotational movement in a high acceleration situation. The result is that rotatable element 17 will overcome the force of float spring 20 causing rotatable element 17 to move in the extension direction. When rotatable element 17 moves sufficiently in the extension direction, radially toothed facing surfaces of stationary and rotating teeth 18 and 19 mesh stopping the rotational movement of locking nut 17. Once rotatable element 17 is prevented from rotating, spindle shaft 11 is locked axially.

Optionally, the embodiment discussed here can be enhanced to protect the structural integrity of the device by providing a shock absorbing function to annular toothed stop sector 16. This is accomplished by annular toothed stop sector 16 being a partially rotatable web held in position in cylindrical housing 9, frictionally or advantageously as widely spaced intermeshed teeth, intercalated with springs to take up play.

Thus, in summary, if movement of spindle shaft 11 is sufficiently abrupt, rotatable element 17 is thrust against annular toothed stop sector 16 allowing rotating teeth 19 to engage stationary teeth 18. The engagement prevents rotatable element 17 from turning further. Because of the engagement of internal spiral threads 33 and external spiral threads 33', spindle shaft 11 is thereby prevented from further movement in the extension direction.

The abruptness with which spindle shaft 11 must be pulled in the extension direction to carry rotatable element 17 with spindle shaft 11 to overcome the force of float spring 20 may be regulated by varying the design of jerk arresting mechanism 1. Since spirally threaded spindle shaft 11 is meshed with internal spiral threads 33 of rotatable element 17, axial movement in the extension direction is translated to rotational movement in rotatable element 17.

Spindle shaft 11 encompasses any rigid or flexible shaft that has a spirally contoured surface that is complimentary to internal spiral threads 33 of rotating locking nut 17 such as, a threaded bolt or a twisted cable having a spirally contoured surface complimentary to internal spiral threads 33 of rotating locking nut 17.

The operating characteristics of jerk arresting mechanism 1 may be selected by varying design parameters as would be understood by a person of ordinary skill in the art. Rotatable element 17 experiences both an axial force and a torque. The axial force is balanced by frictional forces opposing movement in the axial bore of cylindrical housing 9, the inertia of rotatable element 17, and the restoring force of float spring 20. The torque is balanced by the frictional forces opposing rotation in the axial bore of cylindrical housing 9 and by the moment of inertia of rotatable element 17. As would be understood by a person of ordinary skill in the art, these forces can be varied independently of each other by changing the characteristics (including the spring constant) of float spring 20, the moment of inertia of rotatable element 17, the helix angle of internal and external spiral threads 33 and 33', the coefficient of friction of materials, the type of bearing, etc.

Figure 5:
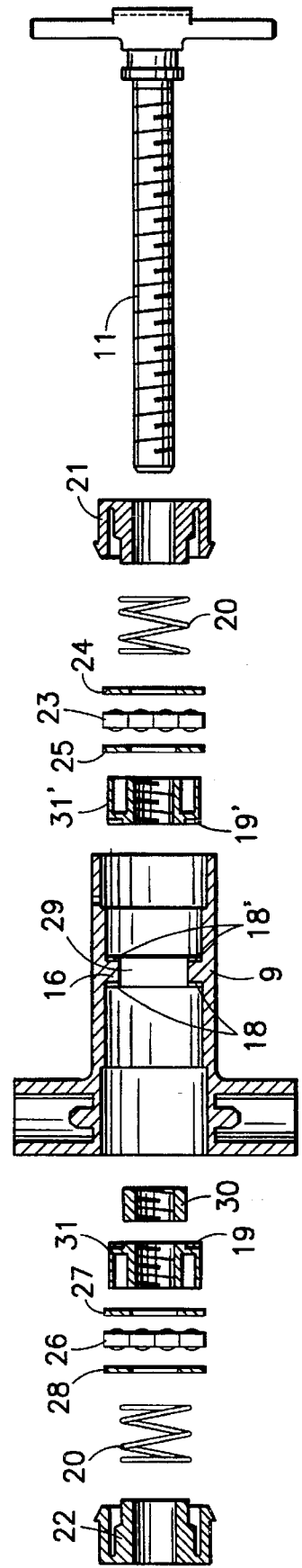
FIG. 5 is an exploded view of an embodiment for a two directional jerk arresting mechanism.
Figure 6:
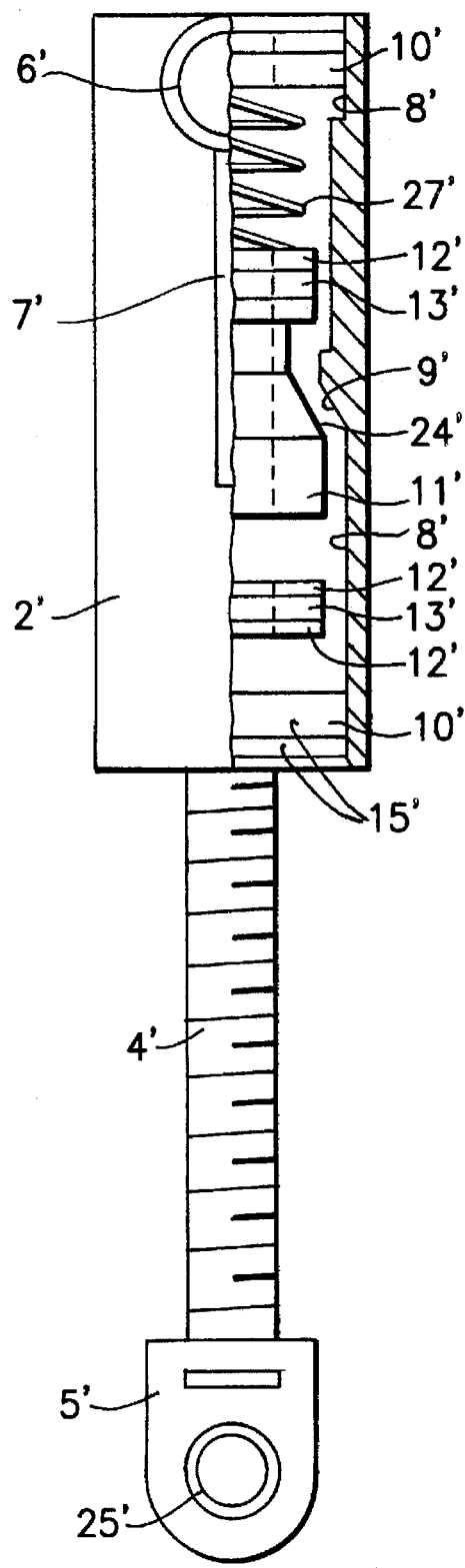
FIG. 6 is a side view of the prior art with a portion of its housing cut away to reveal the detail of its mechanism.

Referring to FIG. 5, it may be desirable to protect bi-directionally against sudden acceleration. The simple addition of another pair of interlocking teeth 18'/19', that mirror the direction of interlocking teeth 18/19, and a second float spring 20', that opposes the force of float spring 20, suffices. Critical to this embodiment, that is not important in other described embodiments, is the axial length of guide sleeve spacer 30. In this embodiment, guide sleeve spacer 30 maintains the separation of interlocking teeth 19 and 19' at a distance to facilitate an equilibrium of position, whereby rotating teeth 19 rotates unencumbered by stationary teeth 18 simultaneous with rotating teeth 19' rotating un-encumbered by stationary teeth 18'. The operating principle remains the same in the two directional embodiment with the mechanism for movement arrest being the interlocking of complementary braking surfaces as a result of translation of a rotating nut against the force of a spring.

Figure 3:
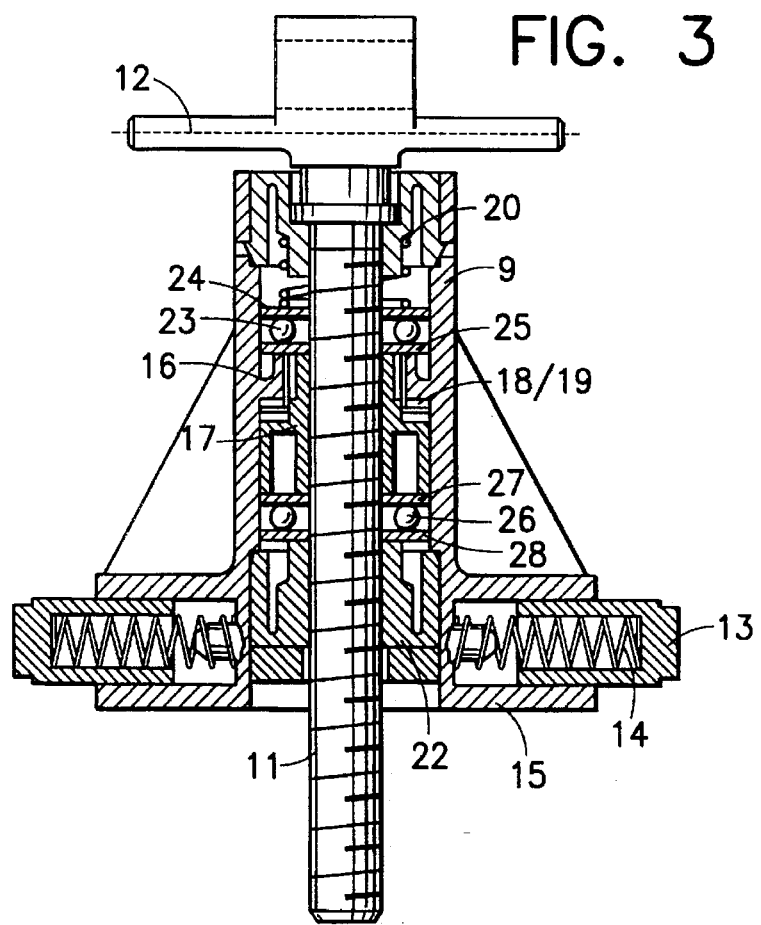
FIG. 3 is a longitudinal section, view taken along the lateral axis, of the fully assembled jerk arresting mechanism showing a spindle shaft fully inserted in a housing of the jerk arresting mechanism according to an embodiment of the present invention.

Operationally, the two directional jerk arresting mechanism has advantages other than bi-directional operation. While the mechanical elements of one way mechanisms, such as shown in FIGS. 2–4, are operating normally in contiguous contact, during a locking event rotatable element 17 separates from the supporting parts 22, 26, 27, and 28 leaving excess free play. Conversely, in the two directional embodiment, FIG. 5, all the moving parts are sandwiched between float springs 20 and 20' and remain contiguous throughout all events. Additionally, the sensitivity to actuate a locking event remains directionally independent by simply utilizing springs with different and variable spring constants.

Having described preferred embodiments of the invention with reference to the accompanying drawings, it is to be understood that the present invention is not limited to those precise embodiments, and that various changes and modifications may be effected therein by one skilled in the art without departing from the scope or spirit of the invention as defined in the appended claims.

For example, although in the above embodiments, float spring 20 has a constant spring constant K, in other embodiments, float spring 20 may be characterized by a non-constant force-displacement characteristic. Such embodiments are considered to be within the scope of the present invention.

Although in the embodiments above, no data is given to describe the mass, size, or material of the rotatable element 17, it is considered to be within the scope of the of the present invention to accomplish ruggedness and sensitivity relative to the task by altering these variables.

Although in the embodiments above, no data is given to describe the helix angle of internal and external spiral threads 33 and 33', it is considered to be within the scope of the present invention to accomplish sensitivity relative to the task by altering these angles.

Although in the embodiments described above, the invention is used to arrest a linear movement. Based on the above disclosure, other embodiments are possible where a rotational movement may be arrested by making simple modifications to the embodiments described above. Such embodiments are also considered to be within the scope of the present invention.

Although in the embodiments described above movement in only one direction is arrested. According to other embodiments movement could be arrested in two directions by providing complementary pairs of rotating and stationary teeth on opposite ends of a rotating locking nut. Such embodiments are also considered to be within the scope of the present invention.

Although in the embodiments described above, the invention is used to arrest linear movement of a non-flexible spirally threaded shaft, other embodiments are possible where the shaft is replaced with flexible twisted cable, and the internal spiral threads on rotatable element 17 are replaced with helical groves that match the helical contour of the twisted cable. Such embodiments are also considered to be within the scope of the present invention.

Although in the embodiments described above, complimentary toothed surfaces are used to accomplish a positive, friction independent, arrest of movement, other embodiments where the shapes, locations and angles of the teeth are varied, such as teeth curved relative to the radii, or teeth complementarily angled axially, are also considered to be within the scope of this invention.

What is claimed is:

1. A jerk arresting mechanism, comprising:

a housing rotatably connected to a first object;

a shaft connected to a second object, said shaft having a longitudinal axis;

said second object movable relative to said first object, whereby said shaft is correspondingly movable along said longitudinal axis;

a rotatable element in said housing;

said shaft passing through said housing and said rotatable element;

means for translating said longitudinal movement of said shaft through said housing into a rotational movement of said rotatable element within said housing;

said rotatable element also being slidable within said housing in a direction parallel to said longitudinal axis of said shaft;

a first stop sector surface on an exterior face of said rotatable element;

a second stop sector surface located on an interior face of said housing means in a position whereby said first braking surface is complementarily juxtaposed to but not touching said second braking surface;

said second stop sector, and said housing means, being rotationally stationary with respect to rotation about said longitudinal axis;

at least one locking element on said first stop sector surface and at least one locking element on said second stop sector surface;

said at least one locking element on said first stop sector surface engagable with said at least one locking element on said second stop sector surface whenever said first stop sector surface is in contact with said second stop sector surface; and means for exerting a limited force to separate said first and second stop sector surfaces whereby said first and second stop sector surfaces remain disengaged until a thrust exerted on said shaft by movement of said first object relative to said second object overcomes said limited force thereby causing first and second stop sector surfaces to engage.

2. A jerk arresting mechanism as recited in claim 1, further comprising at least one bearing for rotationally isolating said rotating element within said housing means.

3. A jerk arresting mechanism as recited in claim 2, wherein;

said at least one locking element of said first stop sector surface is at least one selected from the group consisting of a radially helical tooth, a radially curved tooth, and an axially angled tooth; and said at least one locking element of said second stop sector surface is shaped to complement and intermesh with said at least one element of said first stop sector surface.

4. A jerk arresting mechanism as recited in claim 1 whereby said shaft is non-flexible.

5. A jerk arresting mechanism as recited in claim 1 whereby said second stop sector surface is connected to said housing by a means to absorb rotational shock.

6. A jerk arresting mechanism, comprising:

a spirally threaded shaft;

a rotatable element on said spirally threaded shaft, said rotatable element having at least one rotating tooth;

said rotatable element having a spirally threaded hole complementary to, and rotatably intermeshed with, threads of said spirally threaded shaft;

at least one stationary tooth intermeshable with said at least one rotating tooth, said stationary tooth being stationary with respect to rotation about said spirally threaded shaft; and a float spring to exert a limited force to separate said at least one rotating tooth from said at least one stationary tooth.

7. A jerk arresting mechanism as recited in claim 6 whereby said rotatable element is sandwiched between a pair of bearings on said shaft.

8. A jerk arresting mechanism as recited in claim 7 whereby said at least one rotating tooth is selected from the group consisting of a radially helical tooth, a radially curved tooth, and an axially angled tooth; and said at least one stationary tooth is shaped to complement and intermesh with said at least one rotating tooth.

9. A jerk arresting mechanism as recited in claim 6 whereby:

said spirally threaded shaft is a twisted cable having a spirally contoured surface; and said spirally threaded hole of said rotatable element is a spirally contoured hole complimentary to said spirally contoured surface of said twisted cable.

10. A jerk arresting mechanism as recited in claim 6, further comprising:

a housing;

a stop sector within said housing, said stop sector having said at least one stationary tooth;

said stop sector having an attachment to said housing providing shock absorbing give when said at least one rotating tooth interlocks with said at least one stationary tooth.

11. A jerk arresting mechanism, comprising:

a shaft having a longitudinal axis and a spiral contour;

a rotatable element rotatably engaged on said spiral contour of said shaft;

said rotatable element having rotating teeth;

stationary teeth intermeshable with said rotating teeth, said stationary teeth being stationary with respect to rotation about said longitudinal axis of said shaft;

a float spring that urges said rotating teeth from engaging said stationary teeth; and means for overcoming said float spring and engaging said rotating teeth with said stationary teeth when said shaft slides in a direction of said longitudinal axis faster than said rotatable element can rotate along said spiral contour.

* * * * *